United States Patent
Cyr

(10) Patent No.: US 9,228,695 B2
(45) Date of Patent: Jan. 5, 2016

(54) TRIPOD TO SUPPORT PHOTOGRAPHIC EQUIPMENT WITH TRIPOD LEGS THAT QUICKLY CONVERT FROM A FOLDED CONDITION TO AN ASSEMBLED CONDITION

(75) Inventor: Ryan Cyr, Hidden Hills, CA (US)

(73) Assignee: GuraGear, LLC, Ogden, UT (US)

( * ) Notice: Subject to any disclaimer, the term of this patent is extended or adjusted under 35 U.S.C. 154(b) by 0 days.

(21) Appl. No.: 12/807,212

(22) Filed: Aug. 31, 2010

(65) Prior Publication Data

US 2012/0018597 A1 Jan. 26, 2012

Related U.S. Application Data

(60) Provisional application No. 61/275,942, filed on Sep. 4, 2009.

(51) Int. Cl.
| | | |
|---|---|---|
| *G03B 17/00* | (2006.01) | |
| *F16M 11/24* | (2006.01) | |
| *F16G 11/14* | (2006.01) | |
| *F16M 11/14* | (2006.01) | |
| *F16M 11/36* | (2006.01) | |
| *G03B 17/56* | (2006.01) | |

(52) U.S. Cl.
CPC ............. *F16M 11/242* (2013.01); *F16G 11/14* (2013.01); *F16M 11/14* (2013.01); *F16M 11/36* (2013.01); *G03B 17/561* (2013.01)

(58) Field of Classification Search
CPC ..... F16M 11/14; F16M 11/26; F16M 11/242; F16G 11/14; G03B 17/561
USPC ........... 248/164, 163.1, 165, 166, 168, 176.1, 248/177.1, 188.6, 460, 464; 396/419
See application file for complete search history.

(56) References Cited

U.S. PATENT DOCUMENTS

| | | | | |
|---|---|---|---|---|
| 3,886,700 | A * | 6/1975 | Lambert ................ | E04C 3/005 52/108 |
| 4,324,477 | A * | 4/1982 | Miyazaki ............... | F16M 11/32 248/163.1 |
| 4,712,756 | A * | 12/1987 | Kester .................... | F16M 11/00 248/125.1 |
| 4,934,638 | A * | 6/1990 | Davis ..................... | A47C 4/286 108/118 |
| 5,337,996 | A | 8/1994 | Kalish | |
| 5,510,863 | A * | 4/1996 | Kliewer ................ | F16M 11/14 396/428 |
| 5,713,553 | A | 2/1998 | Cooper | |
| 6,202,974 | B1 * | 3/2001 | Rellinger ............... | A47B 97/08 248/165 |
| 6,282,084 | B1 | 8/2001 | Goerdt et al. | |
| 6,572,061 | B2 * | 6/2003 | Overbeck ................ | A47C 4/20 248/163.1 |
| 7,364,486 | B2 * | 4/2008 | Serpa ........................ | B63B 7/04 441/80 |

* cited by examiner

*Primary Examiner* — Todd M Epps
(74) *Attorney, Agent, or Firm* — Clayton, Howarth & Cannon, P.C.

(57) ABSTRACT

The present invention relates to the concept of a tripod having three separate legs which can placed on a surface such as the ground and which come together at a joint location at the top portion of the legs to retain a support member to which a piece of photographic equipment such as a camera can be attached. The present invention relates specifically to the field of photography tripod support equipment which contains tripod legs wherein each leg of the tripod is composed of a multiplicity of sections which can be folded up and retained in the folded condition for transport and thereafter, can be converted to legs which are immediately in the in-use condition after the mechanism which retains the legs in the folded condition is released to permit the three tripod legs to be quickly unfolded and automatically placed into the in-use condition.

9 Claims, 19 Drawing Sheets

TRIPOD TO SUPPORT PHOTOGRAPHIC EQUIPMENT WITH TRIPOD LEGS THAT QUICKLY CONVERT FROM A FOLDED CONDITION TO AN ASSEMBLED CONDITION

BACKGROUND OF THE INVENTION

1. Field of the Invention

The present invention relates to the field of tripods which are used to support photographic equipment. In particular, the present invention relates to the field of tripods wherein the legs of the tripod can be folded into a multiplicity of sections to facilitate transport and thereafter have the legs converted to an opened condition for use to support a camera or other photographic equipment at a given location.

2. Description of the Prior Art

In general, the subject of photographic equipment tripod legs and related tripod leg support systems which can be folded for easy transport and then converted to an assembled condition for use at a location are known in the prior art. The following 7 patents are relevant to the field of the present invention:

1. U.S. Pat. No. 3,886,700 issued to William M. Lambert on Jun. 3, 1975 for "Collapsible Structural Member" (hereafter the "Lambert patent");
2. U.S. Pat. No. 4,712,756 issued to Eugene A. Kester et al. on Dec. 15, 1987 for "Shock Corded Tripod Stand" (hereafter the "Kester patent");
3. U.S. Pat. No. 4,934,638 issued to Kevin R. Davis on Jun. 19, 1990 for "Collapsible Tripod Stool" (hereafter the "Davis patent");
4. U.S. Pat. No. 5,337,996 issued to Milton Kalish on Aug. 16, 1994 for "Portable Easel System" (hereafter the "Kalish patent");
5. U.S. Pat. No. 5,713,553 issued to Martin F. Cooper on Feb. 3, 1998 for "Portable Stand" (hereafter the "Cooper patent");
6. U.S. Pat. No. 6,202,974 issued to Michael Rellinger on Mar. 20, 2001 for "Portable Easel With Adjustable Board Support" (hereafter the "Rellinger patent");
7. U.S. Pat. No. 6,282,084 issued to Daniel Richard Goerdt et al. on Aug. 28, 2001 for "Transportable Support Apparatus For Portable Computers").

The Lambert patent discloses the concept of having a multiplicity of interconnected members which are connected by a flexible strand which in this case is described in Column 2 Line 39 and 40 as "a wire rope of a particular length". Specifically, the patent discloses:

"A collapsible structural member comprises a plurality of elongated inner elements in spaced end-to-end relationship and attached together by a flexible strand, and a plurality of elongated open-ended outer elements coaxial with the inner elements and positioned in alternating relationship therewith. The outer elements are longer than the distance between adjacent pairs of inner elements and are slidable with respect thereto between extended positions engaging the ends of an adjacent pair of inner elements whereby a substantially rigid member is created, and retracted positions engaging only one inner element, whereby the structural member can be collapsed and folded. Limiting stops are provided in the interior of the outer elements, and means for locking the outer elements in the extended position is provided."

The Kester patent discloses a photographic light stand which embodies the concept of having a tripod grouping of legs which can have at least two components which are held together by a shock cord which is comparable to a bungee cord so that when in the open condition they can immediately open. The device is also used to hold photographic lights.

The Kalish patent discloses a portable easel system which includes the concept of having a multiplicity of leg sections which are retained together and then can open and expand to a full leg with an internal elastic cord. Referring to Column 4 Line 51 through Line 60 the patent states:

"Returning now to FIG. 2, shock cord 43 resiliently connects the three segments of the right leg. Shock cord is a cord composed of a plurality of resilient strands, encased in a protective smooth sheath that allows the cord to slide easily. The shock cord then transverses adjustable cord lock 47. Stop knot 49 at the shock cord upper end keeps cord lock 47 from slipping off the end; this applies to every stop knot contiguous with a cord lock in this patent application."

The Cooper patent discloses:

"In a combination stand and rack releasably secured atop the stand, the stand is convertible between an extended use position and a collapsed storage position. The rack includes a hollow spine for storage of the stand in the collapsed storage position. The stand comprises a main telescopic post and a plurality of support legs all of which are secured to a common housing. The main post extends upwardly from the housing and the legs are attached to the housing by connectors which are bendable through an angle of more than 90° such that the legs fold upwardly beside the main post in the storage position and unfold downwardly from the housing to the use position."

The Redllinger patent discloses a portable easel with an adjustable board support.

The patent discloses:

"A portable easel with adjustable board support which has a plurality of legs pivotally joined together by a head, the legs of which may be selectively spread apart when set up as an easel and folded together when collapsed, each leg composed of multiple interlocked sections biased together when in extended position but which may be manipulated for separation and folding into a bundle one section against another section for storage and transport, and a board support mounted on at least one leg which may be selectively adjustably moved to a desired position on any of the sections and moved against the leg on which it is mounted for storage and transport and extended away from the leg for holding a display on the easel when set up."

The Goerdt patent discloses a transportable support apparatus for portable computers.

The patent discloses:

"A support apparatus for a portable computer, comprising:
(a) a plurality of legs; and
(b) a pedestal configured to support a portable computer, the pedestal further configured to removably couple with the plurality of legs to arrange the legs in an operative position to support the pedestal on a supporting surface, the pedestal including at least one storage compartment configured to store at least one of the plurality of legs in a storage position."

The Davis patent discloses a collapsible tripod stool. Specifically, this patent discloses:

"A collapsible tripod stool for bodily and tangible item support is described. The triangularly shaped seat is supported by a plurality of tubular legs, which may be fused, glued, or otherwise connected to the corners of the seat. In one embodiment, telescoping legs are comprised of upper, central, and lower sections, the central leg section having two different diameters to prevent section contact, and being case as one piece to eliminate welded surfaces. The central leg sections are attached to a triangularly-shaped central pivot joint by threaded members to prevent mobilization of the legs with respect to one another. The telescoping legs are angled to maximize ground surface contact and further stabilize the tripod stool of the present invention. In another embodiment, tubular legs are comprised of upper and lower sections which connect to one another and are coupled together by an elastic cord within each leg. The leg sections are conveniently detached at their approximate midpoints and folded together in a compact bundle. A pivot join comprises fabric straps secured to each leg and centrally joined to one another."

In prior art tripods, the sections of each leg telescope into an adjacent leg with the lowermost section telescoping into the next section and the next section telescoping into a third section etc. until all the legs telescope into the uppermost section. There is a connection which fastens one section relative to another when the legs are moved from the telescoped position to the open position. However, to open and fasten each leg section to another so that the three legs can remain straight involves a lot of time consuming effort. In many cases, there is a requirement for a photographer to instantly have the tripod converted from the folded condition or telescoped condition to the in-use condition so that a shot which may only be available for a few seconds can be made with a camera. Accordingly, the time that it takes to transform a conventional tripod from the closed condition to the open condition is unacceptable where it is necessary to have a quick creation of a fully assembled tripod so that a camera can be used within a matter of seconds to take the appropriate shot. A significant disadvantage of the prior art is that the leg sections are interconnected to each other in a manner which requires each section to be affixed to an adjacent section by means such as a threaded collar which threads from one section to another or a connecting member. Either way, the assembling of the telescope is a time consuming process which is unacceptable for a photographer who needs to be able to have the telescope assembled within seconds so that a photograph can be quickly taken. Therefore, there is a significant need to improve this major deficiency in prior art tripods.

Although the prior art does disclose the general concept of having tripod legs which can be converted from a folded condition to an in-use condition, there is still a significant need for a device that enables the conversion of the tripod legs to the folded condition to the in-use condition to be achieved within a matter of seconds for quick and ready use at a remote location so that a piece of photographic equipment can be quickly mounted to the tripod and placed into the in-use condition.

SUMMARY OF THE INVENTION

The present invention relates to the concept of a tripod having three separate legs which can placed on a surface such as the ground and which come together at a joint location at the top portion of the legs to retain a support member to which a piece of photographic equipment such as a camera can be attached. The present invention relates specifically to the field of photography tripod support equipment which contains tripod legs wherein each leg of the tripod is composed of a multiplicity of sections which can be folded up and retained in the folded condition for transport and thereafter, can be converted to legs which are immediately in the in-use condition after the mechanism which retains the legs in the folded condition is released to permit the three tripod legs to be quickly unfolded and automatically placed into the in-use condition.

It has been discovered according to the present invention that if each of the legs of a tripod is comprised of a multiplicity of sections wherein for each leg, the lowermost section is attached to an end cap or rubber foot by which the section is supported on a surface, and partially within the end cap and extending therefrom is a transverse receiving member having an opening therethrough with an end of a flexible bungee cord extending through the opening and thereafter fastened, and if each of the leg sections is hollow to permit the bungee cord to extend through each respective leg section until the end of the bungee cord is affixed to a connecting pin by which the top section of the leg is attached to the tripod support member which supports photographic equipment, then the tension of the bungee cord will enable all leg sections to immediately align with each other to form a complete leg section within a matter of seconds. The flexible bungee cord also permits each section to be separated from each other and placed into a folded condition so that the leg sections can be retained in the folded condition for transport and thereafter once the leg sections are released from their folded condition, they can immediately be converted to their in-use condition by the tension action of the bungee cord causing each of the leg sections to open and be aligned with each other to form a fully comprised leg section for each of the three legs.

It has further been discovered according to the present invention that if each leg section is comprised of a hollow cylindrical outer wall and has a reduced interior cylindrical wall at one end which is located adjacent to an adjacent leg section, then upon activation of the tension of the bungee cord or flexible cord which retains the leg sections together, the reduced diameter section at one end is immediately inserted into the cylindrical opening of an adjacent leg section to form a secure affixation of one leg section relative to another leg section so that one leg section will not move relative to the other when the entire leg section is formed and is in the in-use condition.

It has further been discovered that to improve the ability of one leg section to be inserted into another, the lowermost section of the reduced cylindrical portion of one leg section has a beveled exterior end and the receiving openings of the adjacent leg section also have a beveled circumferential end so that the beveling enables one leg section to be smoothly inserted into another leg section without catching and without snagging so that the tripod leg sections can be quickly assembled by the tension of the bungee cord.

It has further been discovered according to the present invention that if the three topmost ends of the tripod legs are connected to a mounting base which is used to support a piece of photographic equipment, and the mounting base in turn contains a respective connecting pin by which each respective tripod leg is rotatably connected to the mounting base, then the flexible cord can be attached at the top end of the leg assembly to the mounting pin so that the leg sections can be folded up by virtue of the separation of one section from another but still retained together by the extended flexible cords and after the mechanism by which the legs are retained in the folded condition is released, the legs can be opened to the fully assembled condition by an instantaneous action of the flexible cord causing one leg section to be inserted into another leg section to form a fully assembled leg section for each of the three tripod legs.

It is therefore an object of the present invention to create a tripod assembly which comprises three legs wherein each leg has a multiplicity of separate sections wherein a respective section has a reduced diameter at one end which permits its reduced diameter section to be inserted into the opening of an adjacent section for secure attachment and the assembly can be quickly and automatically converted to a fully assembled leg section because the leg sections are held together by a flexible cord or bungee cord which is affixed at one end of the lowermost leg section and affixed at an upper end of the uppermost connecting section.

It has further been discovered according to the present invention that if the lowermost section comprises an end cap which includes a transverse receiving member with an opening extending therethrough, then the flexible cord can be attached to the transverse receiving member by extending the flexible cord through the opening in the transverse receiving member and tying a knot on the cord so that it is affixed to the transverse receiving member which is retained within the end cap at the lowermost leg section and if the uppermost end of the leg section is rotatably connected to a photographic equipment mounting base through a connecting pin, then the uppermost portion of the flexible cord can be attached to the rotatable connecting pin at the uppermost portion of the uppermost leg section in order to create a strong tension to retain all leg sections together and the fact that the leg sections can be separated by a pulling force to overcome the tension force of the connecting cord enables the leg sections to be folded into a multiplicity of smaller separate sections and retained in the folded condition for transport and upon release of the mechanism by which the legs are retained in the folded condition, the legs automatically will be converted to a fully assembled unitary leg section by virtue of the tension of the flexible cord causing each section to be retained into an adjacent section by virtue of the tension of the flexible cord.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
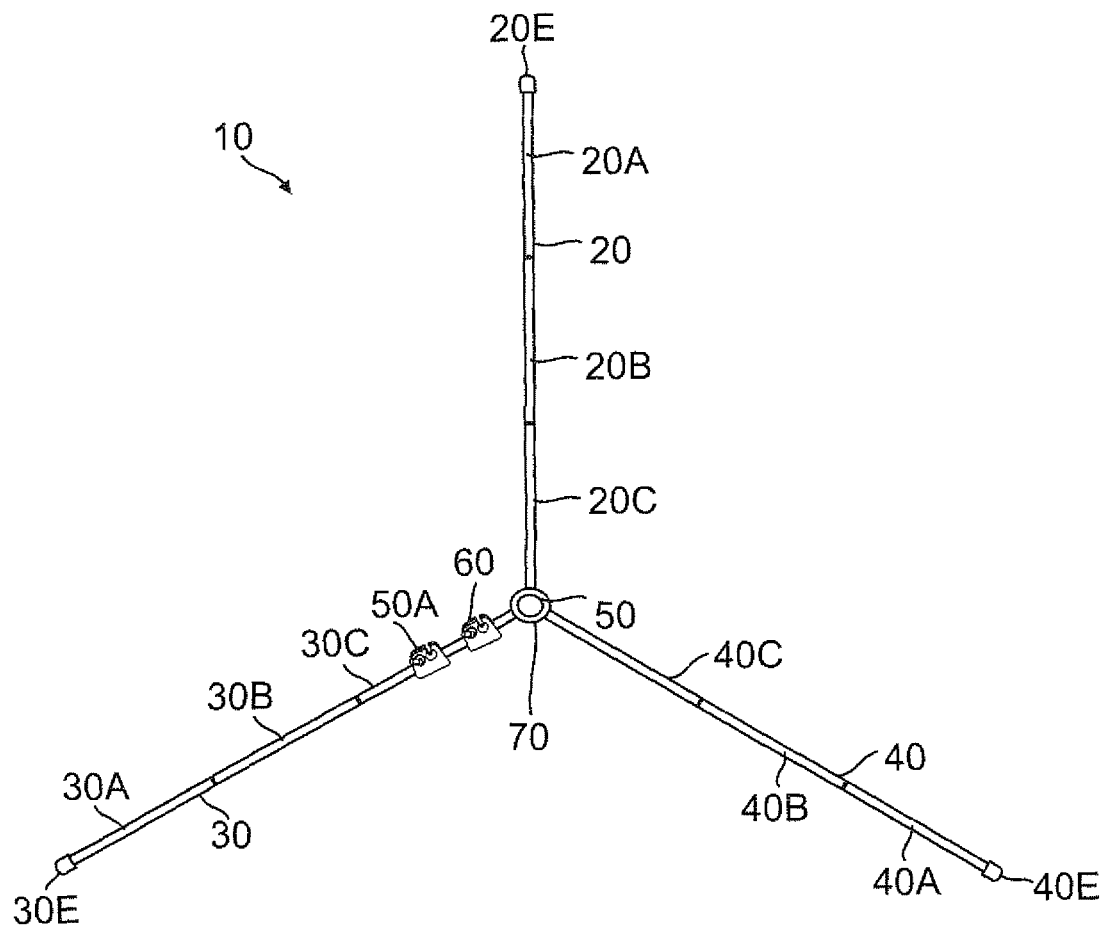
FIG. 1 is top perspective view of one embodiment of the present invention tripod support for photographic equipment disclosing a tripod section having three leg sections which are retained together through the present invention.
Figure 2:
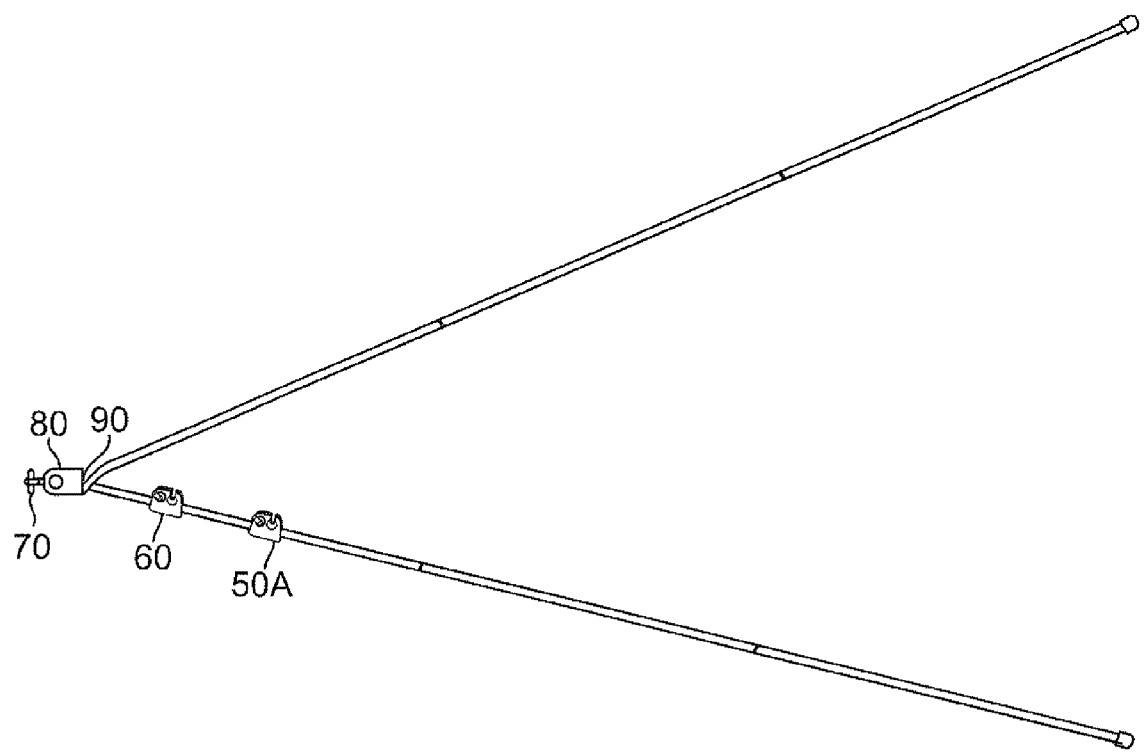
FIG. 2 is a side perspective view of the tripod support for photographic equipment as depicted in FIG. 1 in the assembled condition.
Figure 3:
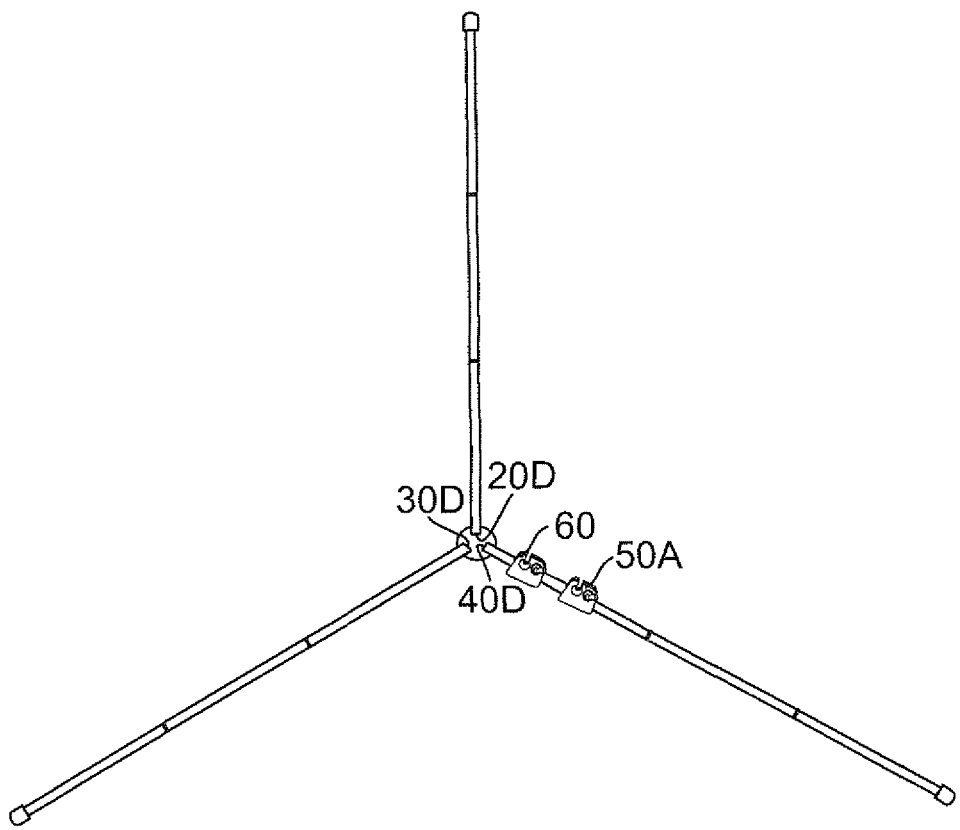
FIG. 3 is another top perspective view of the tripod support for photographic equipment as disclosed in FIG. 1.
Figure 4:
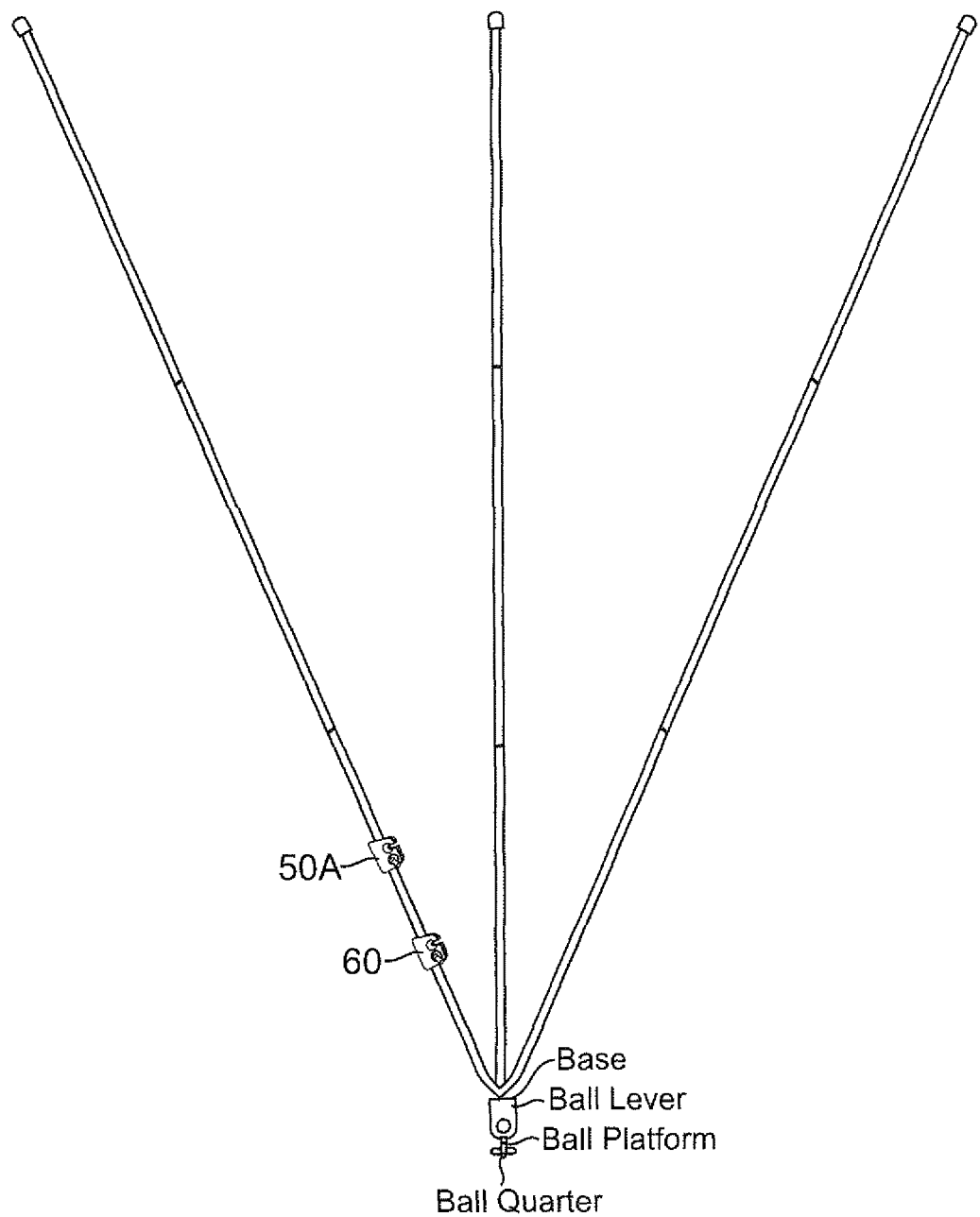
FIG. 4 is a side view of the tripod support for photographic equipment as depicted in FIG. 1.
Figure 5:
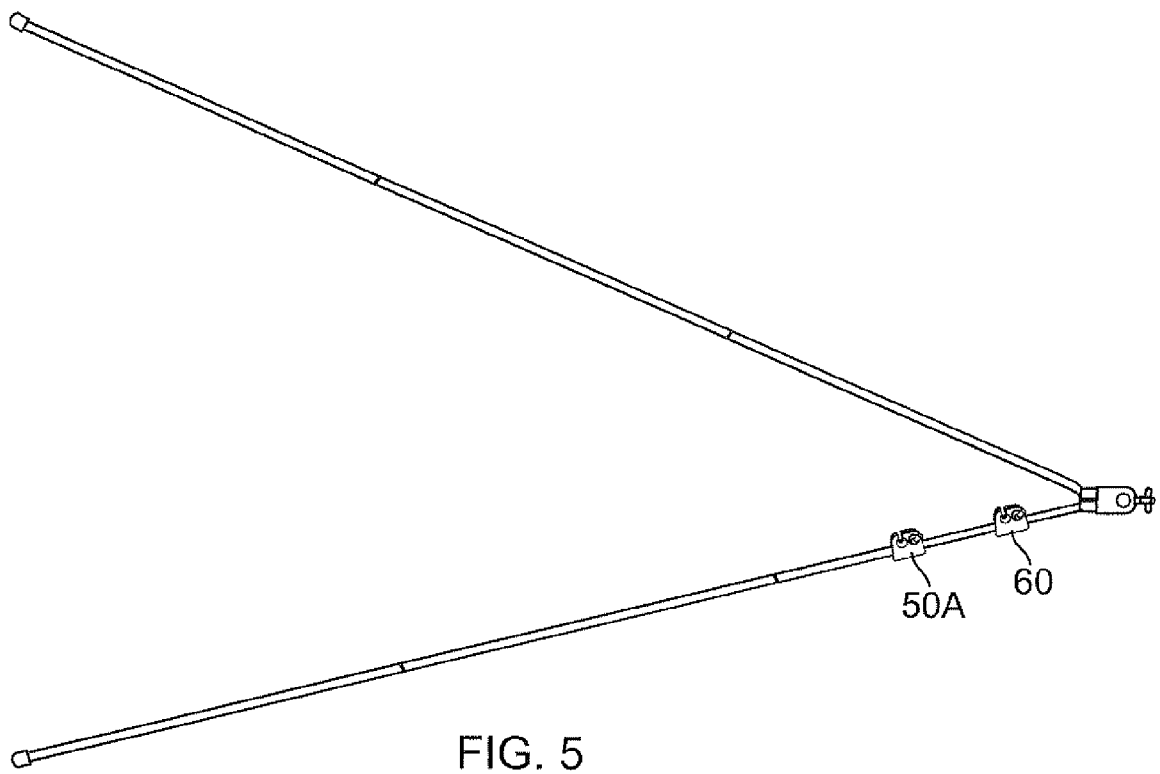
FIG. 5 is another side view of the tripod support for photographic equipment as depicted in FIG. 1.
Figure 6:
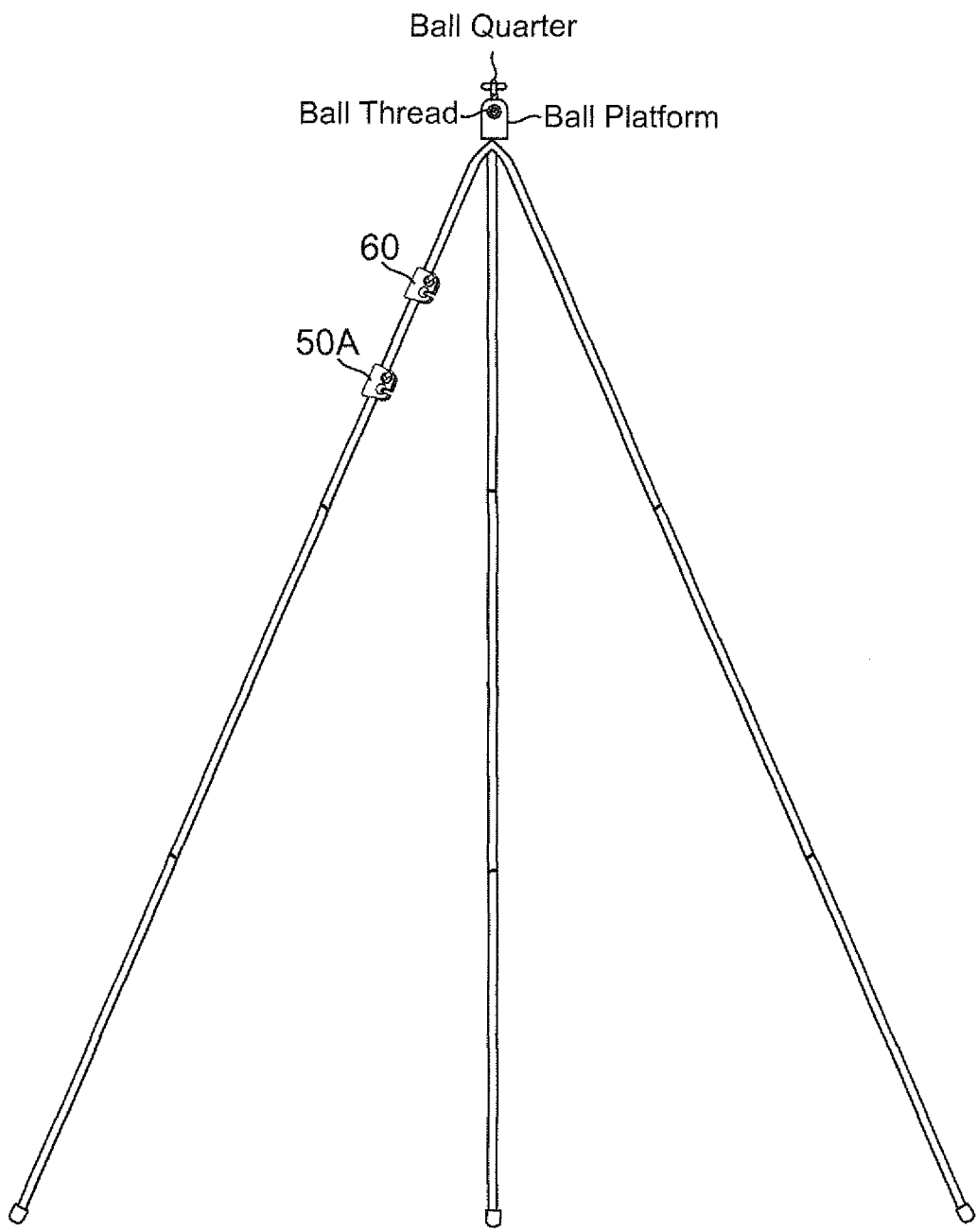
FIG. 6 is a perspective view of the tripod in the fully assembled condition as disclosed in FIG. 1.
Figure 7:
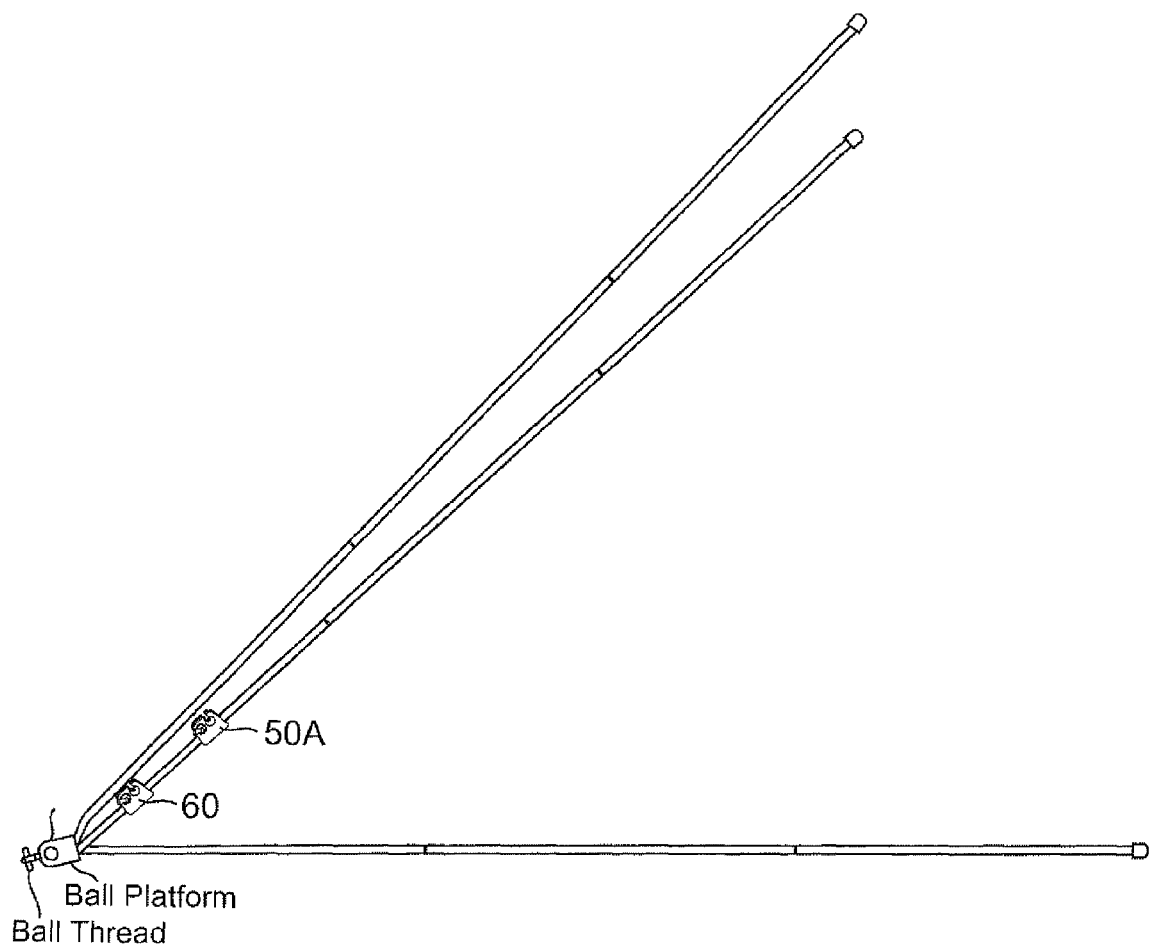
FIG. 7 is a side perspective view of the tripod support for photographic equipment as disclosed in FIG. 1.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is disclosed in two illustrative alternative embodiments which are shown in FIGS. 1-7 and in the photographs FIGS. 8-16. It will be understood that the two embodiments are simply alternative variations of the present invention tripod to support photographic equipment, wherein there are a different multiplicity of leg sections for each respective leg of the tripod. In the assembly shown in the drawings of FIGS. 1-7, there are three separate sections and in the assembly shown in the photographs of FIG. 8-16, there are four separate sections. However, it will be appreciated that the principles by which the present invention works for both sections are the same.

Referring to FIGS. 1-7, the tripod 10 has three leg sections 20, 30 and 40. Each leg section is broken into a multiplicity of separate sections such as three separate sections 20A, 20B and 20C for leg section 20; 30A, 30B and 30C for leg section 30; and 40A, 40B and 40C for leg section 40. Each leg section is comprised of a cylindrical member surrounding an interior hollow cavity. Within the interior hollow cavity of each section of a leg member is a flexible cord such as a bungee cord which creates a tension when the cord is stretched in the expanded condition. The lowermost sections 20A, 30A and 40A of each respective leg section terminate in a respective end cap 20E, 30E and 40E so that when in the assembled condition, the end cap enables the tripod to be firmly positioned on a horizontal surface such as the ground. Within the end cap is a receiving member which extends through the end cap and into an opening in the adjacent leg section. The receiving member contains an opening and the end of the bungee cord is threaded through the opening and thereafter fastened with a knot so that the bungee cord is affixed to the receiving member which partially extends out of the end cap and extends into the opening of the leg section to which the end cap is affixed.

The uppermost ends 20D, 30D and 40D of each section 20C, 30C and 40C are respectively connected to a connecting pin which in turn rotatably affixes the uppermost section of each leg member to a platform 50 by which each leg is rotatably connected to the platform. The rotation connection mechanism is a connecting pin. The upper end of the bungee cord or flexible cord is affixed to the connecting pin. In this manner, when the legs are in the open condition, a tension is created on the interior bungee cord which enables the legs to be immediately retained in an open condition wherein one leg section is affixed to an adjacent leg section so that the entire leg section is formed to create a fully assembled leg section 20, 30 and 40 so that the tripod is ready for use. A photographic equipment support member is affixed to the connecting pad 90 and by way of example, as illustrated in the drawings of FIGS. 1-7, the photographic equipment connecting member can be a ball quarter 80 and connecting member 70 by which a piece of photographic equipment such as a camera can be affixed to the ball quarter for movement and rotation so that the camera can be oriented in any direction.

The photographs of FIGS. 8-16 provide a more detailed view of the present invention.

Figure 8:
FIG. 8 is a perspective view of an alternative embodiment of the present invention tripod support for photographic equipment wherein each leg section has four separate leg sections and the sections are folded together and retained together by a retaining mechanism which causes the four leg sections of each of the three legs to be retained in the folded condition so that the tripod can be easily transported from one location to another.

Specifically, referring to FIG. 8, the present invention in this embodiment comprises a tripod having three legs wherein each of the legs have four separate sections. In the view of FIG. 8, the legs are in the folded condition so that each leg section is folded against an adjacent leg section so that the entire assembly of each of the three leg sections can be folded into a more compact length and retained together by a folding retention mechanism such as a wrap to retain the legs in the folded condition so that the tripod assembly can be easily transported from one location to another.

Figure 9:
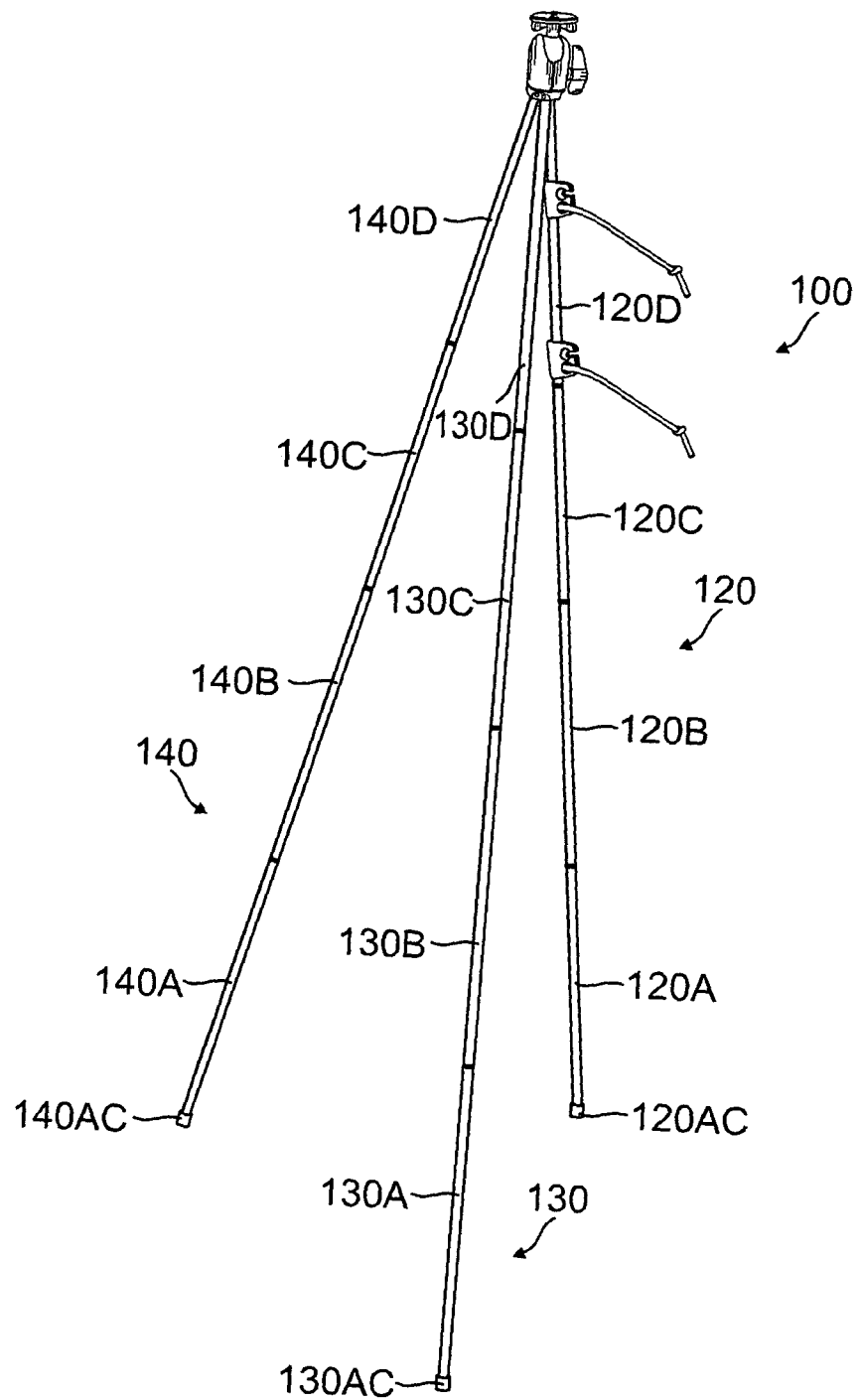
FIG. 9 is a perspective view of the assembled tripod in the open condition.

Referring to FIG. 9, the tripod assembly is shown in its fully assembled condition where the assembly has four sections. Specifically, the photograph of the tripod assembly 100 comprises three separate legs 120, 130 and 140, which have four separate leg sections 120A, 130A and 140A which are the lowermost leg sections respectively connected to a first intermediate section 120B, 130B and 130C respectively connected with separate intermediate sections 120C, 130C and 140C which in turn are respectively connected to a respective uppermost leg section 120D, 130D and 140D.

A closeup view of a location of two interconnecting sections is shown in the photograph of FIGS. 10, 11, 12 and 13.

Figure 10:
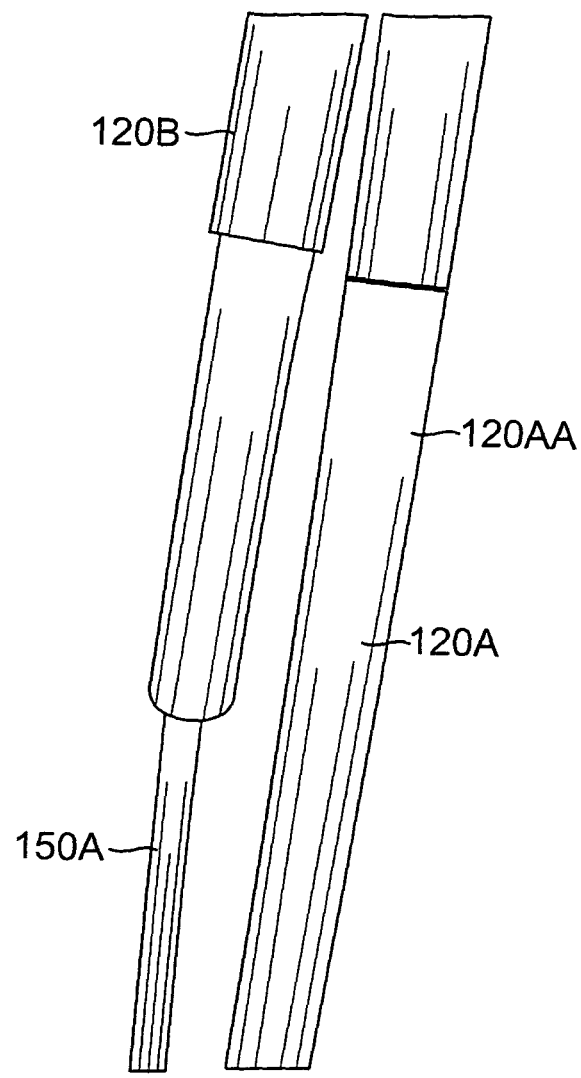
FIG. 10 is an enlarged closeup view of two adjacent leg sections showing one end of a leg section having a reduced cylindrical diameter at one end which can be inserted into the hollow opening of an adjacent leg section for a more secure support.
Figure 11:
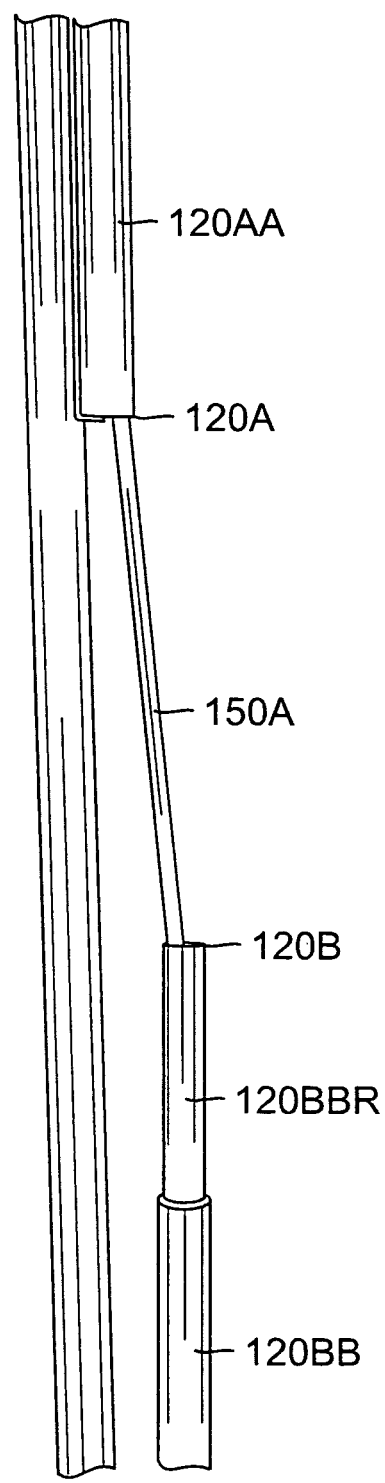
FIG. 11 is a detailed enlarged closeup showing an up-close view of a flexible cord between two sections of a leg section of the present invention tripod.
Figure 12:
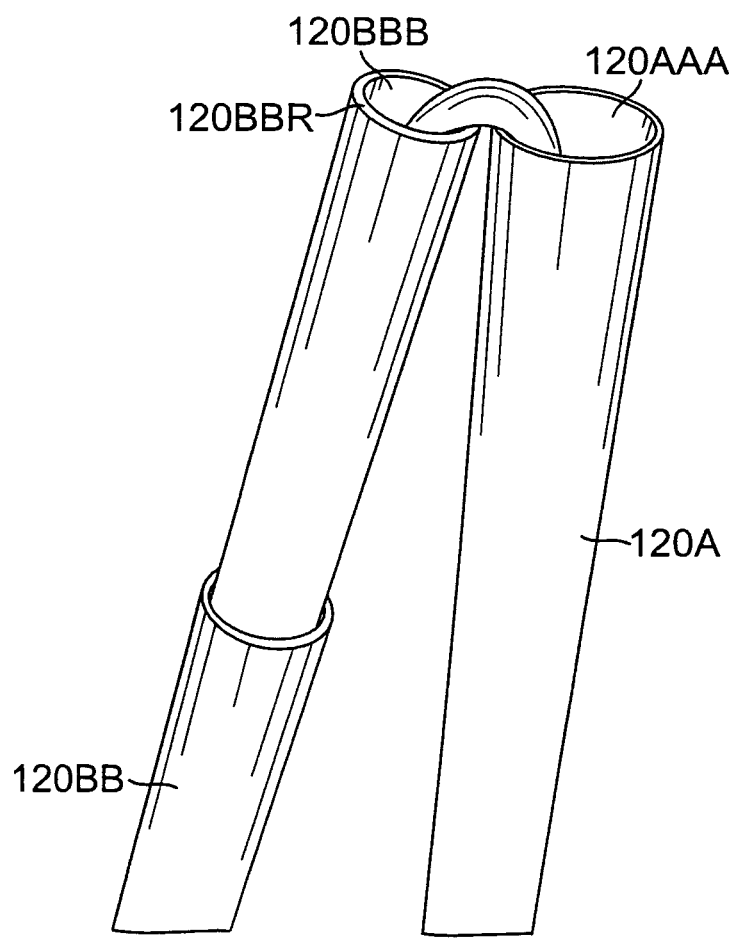
FIG. 12 is an enlarged closeup view of two adjacent leg sections showing the hollow interior openings in each leg section.

Each specific leg section of a leg assembly is comprised of a hollow cylindrical member. Specifically, what is illustrated in FIGS. 10, 11 and 12 is the interconnection location of lowermost leg section 120A and intermediate leg section 120B. The lowermost leg section 120A has an exterior cylindrical wall 120AA and an interior hollow chamber 120AAA which is surrounded by the exterior wall 120AA.

The adjacent leg section 120B has a hollow cylindrical wall 120BB which surrounds the hollow interior chamber 120BBB. At its lowermost end of intermediate interconnecting section 120BB the diameter of the cylindrical wall is reduced so that there is a reduced diameter section 120BBR. The diameter of the reduced diameter section 120BBR is sufficiently small so that it can be inserted into the hollow opening 120AAA of the lowermost section 120A to form a strong press fit so that the two sections are securely retained together. Also illustrated in FIGS. 10, 11 and 12 is a portion of the interconnecting bungee cord 150A.

Figure 13:
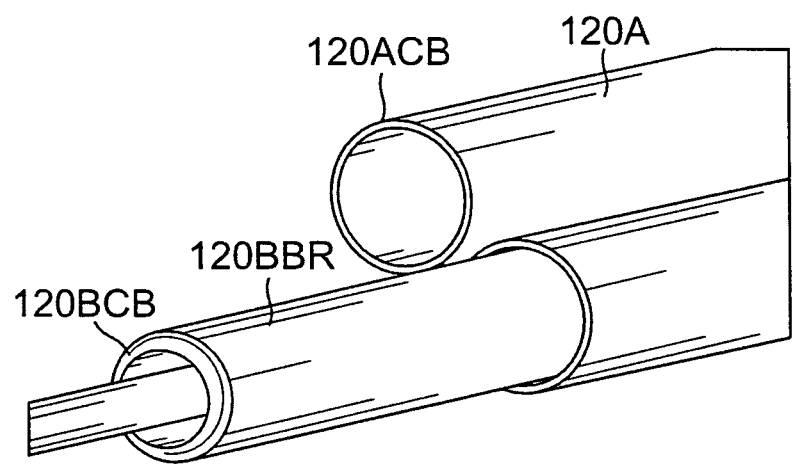
FIG. 13 is an enlarged detailed closeup view of two adjacent leg sections showing the hollow interior opening of each leg section where the exterior circumference of the reduced cylinder portion of one leg section has a beveled circumference and the circumference of the receiving opening of the adjacent leg section also has a beveled circumference.

Referring to FIG. 13, to improve the efficiency by which one leg section is inserted into another, in the preferred embodiment of the interconnection section, the cylindrical circumference of the wall of the receiving opening and the cylindrical circumference of the reduced diameter portion of the adjacent leg section both have beveled circumferential surfaces. Specifically referring to FIG. 13, receiving leg 120A has an exterior circumferential surface at the receiving end, which exterior circumferential surface 120ACB is beveled. Similarly, on the reduced diameter portion 120BBR of the adjacent leg section, its circumferential edge at its end 120BCB is also beveled. In this way, the respective beveling members enable the one adjacent leg to be inserted into another adjacent leg. It will be appreciated that the respective adjacent ends of each leg section have circumferential beveled surfaces to facilitate the insertion of one leg section into another leg section.

Figure 14:
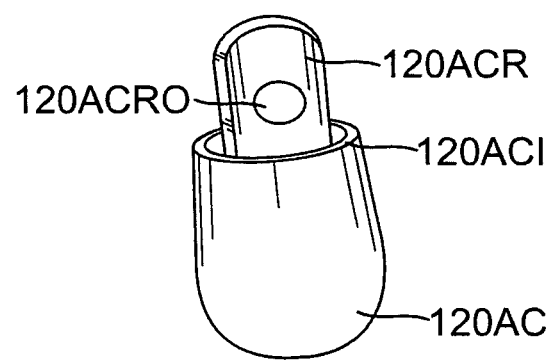
FIG. 14 is a perspective view of a rubber foot with a transverse receiving member having a receiving opening to receive an end of a bungee cord.
Figure 15:
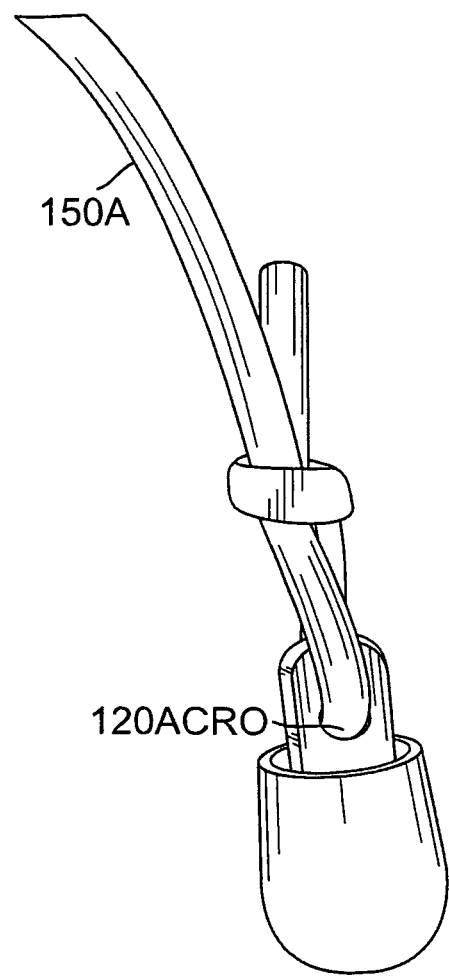
FIG. 15 is a perspective view of the end cap with the transverse receiving member and a bungee cord extending through an opening in the transverse receiving member and knotted so that the bungee cord remains affixed to the transverse receiving member.

Referring to FIG. 9, as shown in the fully assembled tripod, the lowermost sections of each leg 120A, 130A and 140A terminate in an end cap 120AC, 130AC and 140AC respectively so that the tripod can rest firmly on the ground. The end cap slides over the lowermost end of each respective leg section. A closeup of the end cap is shown in FIGS. 14 and 15. Referring to FIG. 14, end cap 120AC has within it an interior circumferential opening 120ACI and a transverse receiving member 120ACR with a receiving opening 120ACRO. One end of the bungee cord 150A is inserted through opening 120ACRO and knotted so that the lowermost end of the bungee cord is affixed to the opening. Thereafter, the end cap is slid over the lowermost portion of the leg section and in this way, the lowermost portion of the bungee cord is affixed in a permanent way. This is also true for respective end caps 130AC and 140AC.

Figure 16:
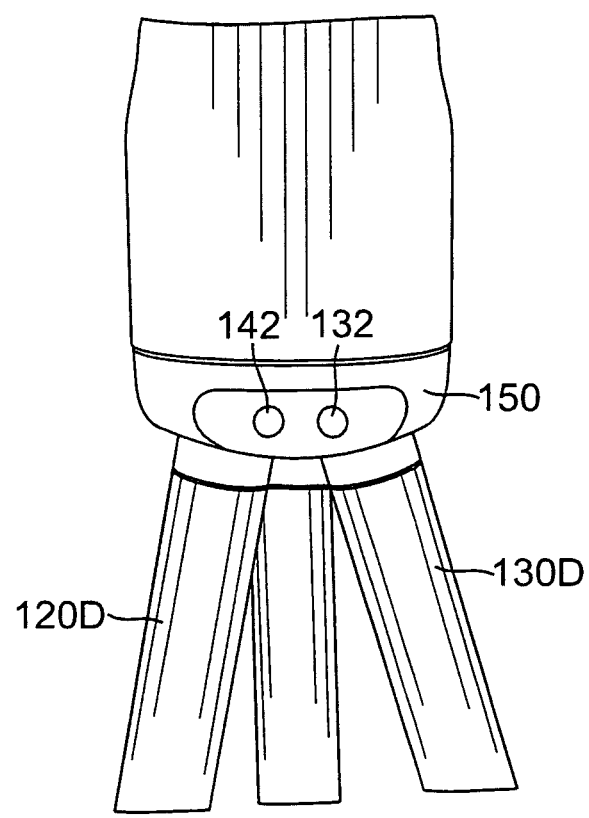
FIG. 16 is a perspective view of the three leg sections connected to a photograph support mounting based by a rotatable connecting pin to which the uppermost end of a flexible cord of a leg section is affixed.

Referring to FIG. 16 there is illustrated a closeup view of the rotatable attachment pin by which the uppermost end of uppermost section 120D is rotatably attached to a tripod platform 150. The uppermost end of flexible cord 150A is affixed to the transverse pin within the interior of the uppermost section 120D. It will be appreciated that the flexible cord 150A extends through the entire length of the four leg sections 120A, 120B, 120C and 120D, so that when the leg sections are in the opened condition, the tension on the bungee cord causes the leg sections to be affixed to one another. It will be appreciated that the same assembly is utilized for each of the other two leg sections 130 and 140. Leg section 130 has four sections, 130A, 130B, 130C and 130D, which are retained together by a separate flexible bungee cord or flexible cord comparable to the cord illustrated in FIGS. 10, 11 and 12 and the cord is affixed to a transverse receiving member retained in end cap 130A on the lowermost portion of the leg and is affixed to a transverse connecting pin 132 by which the uppermost section of leg section 130D is rotatably connected to the transverse platform.

For the embodiment with three sections illustrated in FIGS. 1-7, comparable wrapper members 60 and 50A are on a leg section as illustrated so that the three legs can be folded and tied together in the same manner as discussed above for the four leg section members. It functions exactly the same way in the same manner with the exception that it is used with three leg sections instead of four leg sections.

Leg section 140 has four sections, 140A, 140B, 140C and 140D, which are retained together by a separate flexible bungee cord or flexible cord comparable to the cord illustrated in FIGS. 10, 11 and 12 and the cord is affixed to a transverse receiving member retained in end cap 140A on the lowermost portion of the leg and is affixed to a transverse connecting pin 142 by which the uppermost section of leg section 140D is rotatably connected to the transverse platform.

Figure 17:
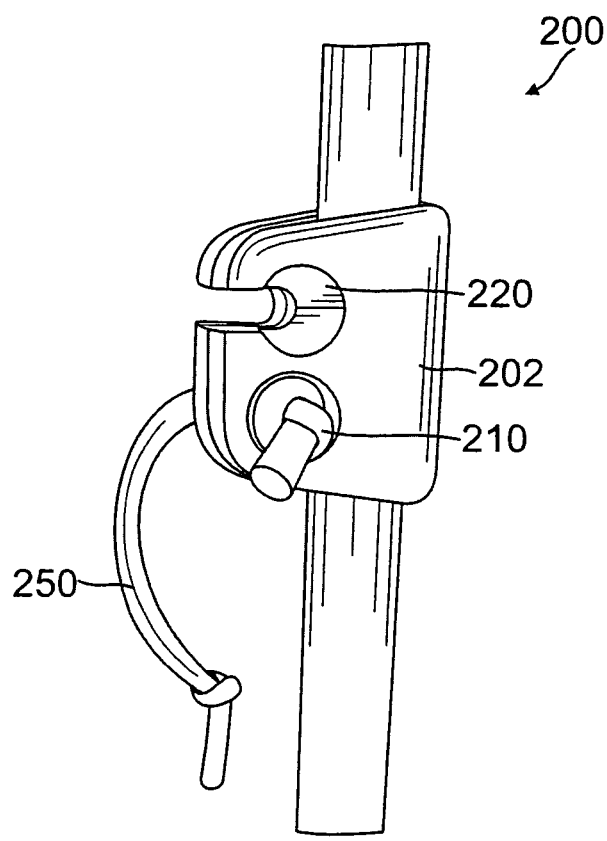
FIG. 17 is an enlarged closeup view of the connecting mechanism which permits the leg sections of the tripod assembly to be retained together in the folded condition.
Figure 18:
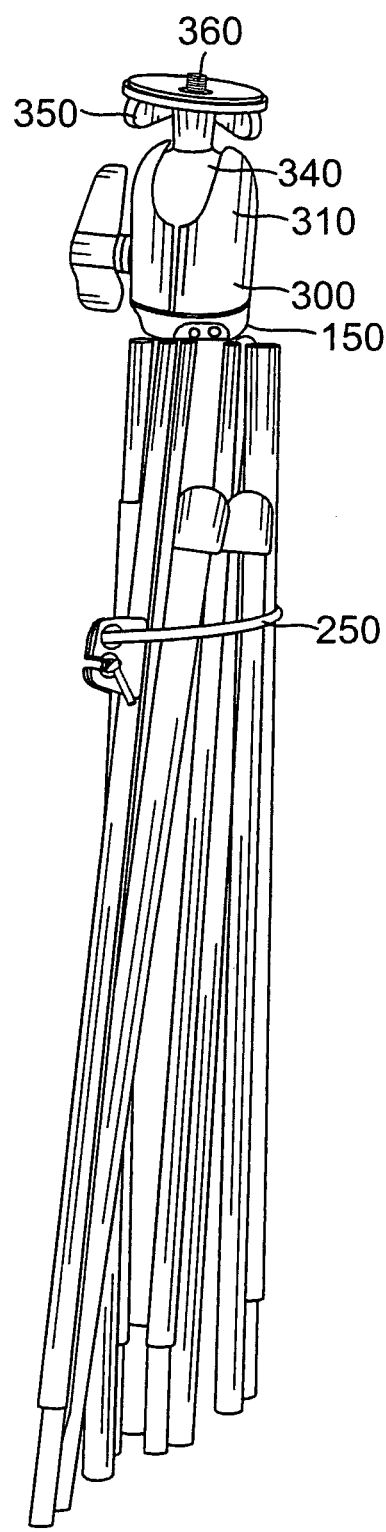
FIG. 18 is a perspective view of the tripod in the folded condition with legs retained together by the wrapping mechanism.

A closeup view of the leg wrapper member is illustrated in FIG. 17. It will be appreciated that this is only one of many possible connecting members. The wrapper member 200 consists of a body 202 which can rotatably slide on one leg section and has a connecting flexible strap 250 extending through opening 210 and extending through second opening 220 in the body which in turn permits the strap to be wrapped around the three folded leg sections as illustrated in FIG. 18 and thereafter affixed into a slotted opening 220 in the wrapper member 200 so that the connection is securely retained to retain all three leg sections together in the folded condition. While one wrapper member 200 is illustrated, in the preferred embodiment there are two spaced apart wrapper members 200 and 200A on a leg section. The two spaced apart wrapper members are the same leg section and provide a double security retention when the tripod is in the folded condition.

Figure 19:
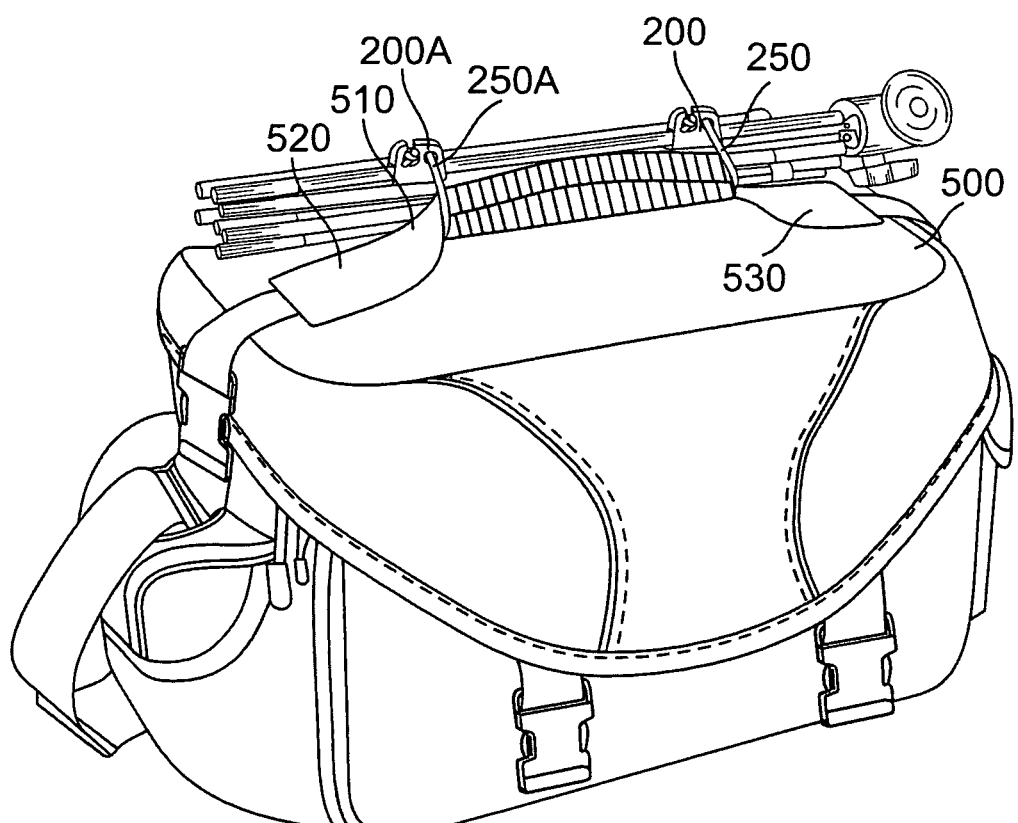
FIG. 19 is a perspective view of the tripod in the folded condition with legs retained together by the wrapping mechanism, with the cord of the wrapping mechanism also wrapped around the handle of a camera bag so that the tripod can be carried with the camera bag.

As illustrated in FIG. 19, the flexible straps 250 and 250A of the wrapper members 200 and 200A serve to retain the three leg sections together. As further illustrated in FIG. 19, the flexible strap can also be used to retain the entire folded tripod to a portion of a camera bag such as the handle of a camera bag. In FIG. 19, the camera bag 500 has a handle section 510 with a left side handle section 520 and a right side handle section 530. As shown, the flexible strap 250 of wrapper member 200 can be not only wrapped around the legs, but also wrapped around one handle section 530 and the flexible strap 250A of wrapper member 200A can be wrapped around another portion 520 of the handle section 510 of the camera bag 500 so that the tripod in addition to being retained in the folded condition by the flexible straps of the wrapper member, can also be retained to the handle of a camera bag or other portion of the camera bag to be carried therewith. This eliminates the necessity of having a separate case to carry the tripod or having the tripod take up valuable space within the camera bag.

When in the folded condition, each of the separate bungee cords within the legs are in a stretched but not taut condition so that each section of each leg section is retained together but are retained in the folded condition so that the tripod assembly can be easily transported. When the wrapper member 200 is released from its slotted member 220, the tension on each respective bungee cord or flexible cord within each leg section immediately causes each leg section to extend into the open condition so that one reduced diameter section of a leg section is automatically forced into the opening of an adjacent leg section and the flexible bungee cord retains all four leg sections in a fully assembled condition. Because of the tension on the bungee cord, this action takes place within a matter of seconds. All three legs section are each assembled in to the in-use condition in this manner.

Each leg section is rotatably connected to a platform 150. The platform in turn as illustrated can support a photographic equipment mounting member which as illustrated in the photograph of FIG. 18 are hemispherical sections 300 and 310 which in turn support a rotatable ball member 340 which contains a platform 350 and a threaded member 360 extending through the platform, which threaded member can be threaded into a receiving member on a piece of photographic equipment such as a female threaded opening within a camera. The camera then can be rotated and adjusted to any desired angle based upon the rotation of the ball member 340 and an adjustment means on the ball member. It will be appreciated that the rotatable ball member is only one of many possible photographic attachment means which can be used with the present invention. The essence of the present invention is the tripod assembly wherein the legs can be positioned into a folded condition and retained therein as described above and upon release of the wrapping mechanism can automatically be extended into the in-use condition by the force of the bungee cord causing the leg sections to immediately open with an interior lower diameter section of one leg section forced into the interior chamber of an adjacent leg section and the four leg sections of a leg section retained in a taut condition for use.

While the reduced diameter portion is the preferred embodiment, it will be appreciated that it is also within the spirit and scope of the present invention for each leg section to have the same diameter and not have a reduced diameter portion at a location where it is adjacent another leg section so that in effect, the four leg sections are retained together simply by the force of the flexible cord or bungee cord. However, the reduced diameter feature is an improvement which enables the attachment to be far more secure so that one leg section will not bend relative to another leg section and so that all four leg sections can remain in a very strong secure position to support any piece of heavy photographic equipment which is placed on the photographic equipment attachment assembly at the top of the platform pad.

The present invention therefore enables the tripod to be placed into a folded condition for easy transport and when the mechanism by which the tripod legs are retained together is released, the legs immediately extend and open into the fully in-use condition within a matter of seconds because of the tension of the bungee cord forcing the multiplicity of leg sections together so that the tripod is in the fully assembled condition and ready for use within a matter of seconds.

While the disclosure has shown three leg sections in FIGS. 1-7 and four leg sections in FIGS. 8-18, it will be appreciate that it is within the spirit and scope of the present invention to have any multiplicity of leg sections forming the tripod assembly. While the most efficient way is to have the same number of leg sections on each of the three legs of the tripod, it will be appreciated that it is also within the spirit and scope of the present invention to enable each leg section to have a different multiplicity of leg sections therein. Therefore, one leg section may have three sections and one leg section may have four sections and one leg section may have five sections although the preferred embodiment is to have the same number of sections in each leg.

In the preferred embodiment, the legs are made of metal such as lightweight aluminum, steel or titanium. It is also within the spirit and scope of the present invention to have the leg sections made of strong plastic, strong polyvinyl or carbon fiber.

The preferred retention cord which retains the leg sections together is a bungee cord but it will be appreciated that any lengthwise mechanism which creates a tension to force the leg sections together is within the spirit and scope of the present invention to retain the leg sections in the fully assembled condition and also permit the leg sections to be separated and placed into a folded condition for transport.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A tripod to retain photographic equipment, the tripod consisting of:
    a. a first leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a first end cap having a receiving member therein, the first end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on a platform by the connecting pin, the platform having a member to retain the photographic equipment;
    b. a second leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a second end cap having a receiving member therein, the second end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on the platform by the connecting pin;
    c. a third leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a third end cap having a receiving member therein, the third end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on the platform by the connecting pin;
    d. a wrapper member having a body slidably retained on a section of the first leg, the wrapper including a flexible strap retained at one end on the body, the second end of the flexible strap retained on a receiving opening in the body;

e. the respective upper section, middle section and lower section of the first leg member, second leg member and third leg member are foldable so that, in the folded condition, each section of each leg member is separated from an adjacent section on the leg member and folded so that the three sections of each leg member are adjacent to each other but retained together by the flexible and stretchable cord extending through the three sections of a given leg member, the folded sections of the three legs retained together by the flexible strap on the wrapper member wrapped around all sections of all three leg members and fastened by the second end retained in the receiving opening in the body of the wrapper member, and when the flexible strap is unwound, a respective one of the middle and lower sections of each leg member rapidly close into an adjacent leg section and a respective one of the middle and upper sections of each leg member rapidly close into an adjacent leg section to rapidly form an erect tripod, with the three leg members each retained in an opened condition due to the tension on the interior in each respective leg member created by a respective flexible and stretchable cord inside each respective leg member serves to form an erect tripod, the three leg members only connected by the platform, the three leg members retained in an opened condition to support the photographic equipment without requiring any additional interconnecting support between the three leg members;

f. each of the three leg sections which are connected to the platform are rotatably connected to the platform, the platform in turn is used to support a photographic equipment mounting member which are hemispherical sections which in turn support a rotatable ball member which contains the platform and a threaded member extending through the platform, which threaded member is threaded into a receiving member on a piece of photographic equipment so that the piece of photographic equipment is rotated and adjusted to any desired angle based on the ball member and an adjustment member on the ball member; and, g. each of the three leg members when in the opened condition are sufficiently strong to support a piece of photographic equipment.

2. The tripod in accordance with claim 1 further consisting of the flexible strap of the wrapper member is of sufficient length to enable the flexible strap to be affixed to a handle of a camera bag when the tripod is in the folded condition.

3. The tripod in accordance with claim 1 wherein each section of each leg is the same length.

4. The tripod in accordance with claim 1 wherein each leg has sections which are of different lengths.

5. A tripod consisting of:
a. a first leg member having four separate sections, an upper section having a first end and a second end, an upper intermediate section having a first end and a second end, a lower intermediate section having a first end and a second end, a lower section having a first end and a second end, each leg section having a cylindrical outer wall surrounding an interior hollow cavity, the first end of the upper intermediate section having a beveled outer surface adjacent the first end and a diameter which is smaller than a diameter of the hollow cavity of the upper section at its second end, the second end of the upper section also beveled, the beveled ends facilitating insertion of the first end of the upper intermediate section into the hollow cavity of the upper section at its second end, the first end of the lower intermediate section having a beveled outer surface adjacent the first end and a diameter which is smaller than a diameter of the hollow cavity of the upper intermediate section at its second end, the second end of the lower intermediate section also beveled, the beveled ends facilitating insertion of the first end of the lower intermediate section into the hollow cavity of the upper intermediate section at its second end, the first end of the lower section having a beveled outer surface adjacent the first end and a diameter which is smaller than a diameter of the hollow cavity of the lower intermediate section at its second end, the second end of the lower section also beveled, the beveled ends facilitating insertion of the first end of the lower section into the hollow cavity of the upper intermediate section at its second end, a first end cap having a receiving member therein, the first end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, upper intermediate, lower intermediate, and lower sections, the flexible and stretchable cord having a first end retained on the connecting pin and a second end retained on the receiving member, the cord in tension which causes the first end of the lower section to be rapidly inserted into the second end of the lower intermediate section, the first end of the lower intermediate section to be rapidly inserted into the second end of the upper intermediate section, and the first end of the upper intermediate section to be rapidly inserted into the second end of the upper section, the upper section rotatably retained on a platform by the connecting pin, the platform having a member to retain the photographic equipment;

b. a second leg member having four separate sections, an upper section having a first end and a second end, an upper intermediate section having a first end and a second end, a lower intermediate section having a first end and a second end, a lower section having a first end and a second end, each leg section having a cylindrical outer wall surrounding an interior hollow cavity, the first end of the upper intermediate section having a beveled outer surface adjacent the first end and a diameter which is smaller than a diameter of the hollow cavity of the upper section at its second end, the second end of the first section also beveled, the beveled ends facilitating insertion of the first end of the upper intermediate section into the hollow cavity of the upper section at its second end, the first end of the lower intermediate section having a beveled outer surface adjacent the first end and a diameter which is smaller than the diameter of the hollow cavity of the upper intermediate section at its second end, the second end of the lower intermediate section also beveled, the beveled ends facilitating insertion of the first end of the lower intermediate section into the hollow cavity of the upper intermediate section at its second end, the first end of the lower section having a beveled outer surface adjacent the first end and a diameter which is smaller than a diameter of the hollow cavity of the lower intermediate section at its second end, the second end of the lower section also beveled, the beveled ends facilitating insertion of the first end of the lower section into the hollow cavity of the upper intermediate section at its second end, a first end cap having a receiving member therein, the first end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, upper intermediate, lower intermediate, and lower sections, the flexible and stretchable cord having a first end retained on the connecting pin and a second end retained on the receiving member, the cord in tension which causes the first end of the lower section to be rapidly inserted into the second end of the lower intermediate section, the first end of the lower intermediate section to be rapidly inserted into the second end of the upper intermediate section, and the first end of the upper intermediate section to be rapidly inserted into the second end of the upper section, the upper section rotatably retained on the platform by the connecting pin, the platform having a member to retain the photographic equipment;

c. a third leg member having four separate sections, an upper section having a first end and a second end, an upper intermediate section having a first end and a second end, a lower intermediate section having a first end and a second end, a lower section having a first end and a second end, each leg section having a cylindrical outer wall surrounding an interior hollow cavity, the first end of the upper intermediate section having a beveled outer surface adjacent the first end and a diameter which is smaller than a diameter of the hollow cavity of the upper section at its second end, the second end of the first section also beveled, the beveled ends facilitating insertion of the first end of the upper intermediate section into the hollow cavity of the upper section at its second end, the first end of the lower intermediate section having a beveled outer surface adjacent the first end and a diameter which is smaller than a diameter of the hollow cavity of the upper intermediate section at its second end, the second end of the lower intermediate section also beveled, the beveled ends facilitating insertion of the first end of the lower intermediate section into the hollow cavity of the upper intermediate section at its second end, the first end of the lower section having a beveled outer surface adjacent the first end and a diameter which is smaller than a diameter of the hollow cavity of the lower intermediate section at its second end, the second end of the lower section also beveled, the beveled ends facilitating insertion of the first end of the lower section into the hollow cavity of the upper intermediate section at its second end, a third end cap having a receiving member therein, the third end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, upper intermediate, lower intermediate, and lower sections, the flexible and stretchable cord having a first end retained on the connecting pin and a second end retained on the receiving member, the cord in tension which causes the first end of the lower section to be rapidly inserted into the second end of the lower intermediate section, the first end of the lower intermediate section to be rapidly inserted into the second end of the upper intermediate section, and the first end of the upper intermediate section to be rapidly inserted into the second end of the upper section, the upper section rotatably retained on the platform by the connecting pin, the platform having a member to retain the photographic equipment;

d. a wrapper member having a body slidably retained on a section of the first leg, the wrapper including a flexible strap retained at one end on the body, the second end of the flexible strap retained on a receiving opening in the body;

e. the respective upper section, upper intermediate section, lower intermediate section and lower section of the first leg member, second leg member and third leg member are foldable so that in the folded condition, each section of each leg member is separated from an adjacent section on the leg member and folded so that the four sections of each leg member are adjacent to each other but retained together by the flexible and stretchable cord extending through the four sections of a given leg member, the folded sections of the four legs retained together by the flexible strap on the wrapper member wrapped around all sections of all three leg members and fastened by the second end retained in the receiving opening in the body of the wrapper member, and when the flexible strap is unwound, a respective one of the lower intermediate and lower sections of each leg member rapidly close into an adjacent leg section, a respective one of a lower intermediate and upper intermediate sections of each leg section rapidly close into an adjacent leg section, and a respective one of the upper intermediate and upper sections of each leg member rapidly close into an adjacent leg section to rapidly form an erect tripod with the three leg members each retained in an opened condition due to the tension on the interior in each respective leg member created by a respective flexible and stretchable cord inside each respective leg member serves to form an erect tripod, the three leg members only connected by the platform, the three leg members retained in an opened condition to support the photographic equipment without requiring any additional interconnecting support between the three leg members;

f. each of the three leg sections which are connected to the platform are rotatably connected to the platform, the platform in turn is used to support a photographic equipment mounting member which are hemispherical sections which in turn support a rotatable ball member which contains the platform and a threaded member extending through the platform, which threaded member is threaded into a receiving member on a piece of photographic equipment so that the piece of photographic equipment is rotated and adjusted to any desired angle based on the rotation of the ball member and an adjustment member on the ball member; and, g. each of the three leg members when in the opened condition are sufficiently strong to support a piece of photographic equipment.

6. The tripod in accordance with claim 5 further consisting of the flexible strap of the wrapper member is of sufficient length to enable the flexible strap to be affixed to a handle of a camera bag when the tripod is in the folded condition.

7. The tripod in accordance with claim 5 wherein each section of each leg is the same length.

8. The tripod in accordance with claim 5 wherein each leg has sections which are of different lengths.

9. A tripod to retain photographic equipment, the tripod comprising:

a. a first leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a first end cap having a receiving member therein, the first end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on a platform by the connecting pin, the platform having a member to retain the photographic equipment;

b. a second leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a second end cap having a receiving member therein, the second end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on the platform by the connecting pin;

c. a third leg member having three separate sections, an upper section having a first end and a second end, a middle section having a first end and a second end, a lower section having a first end and a second end, each leg section having a cylindrical outer wall surrounding an interior hollow cavity, the first end of the middle section having a beveled outer surface adjacent the first end and a diameter which is smaller than a diameter of the hollow cavity of the upper section at its second end, the second end of the upper section also beveled, the beveled ends facilitating insertion of the first end of the middle section into the hollow cavity of the upper section at its second end, the first end of the lower section having a beveled outer surface adjacent the first end and a diameter which is smaller than a diameter of the hollow cavity of the middle section at its second end, the second end of the middle section also beveled, the beveled ends facilitating insertion of the first end of the lower section into the hollow cavity of the middle section at its second end, a third end cap having a receiving member therein, the third end cap retained on the lower section at its second end so that the receiving member is retained in the hollow cavity of the lower section adjacent its second end, a connecting pin extending through the upper section adjacent its first end, a flexible and stretchable cord extending through the interior hollow cavity of the upper, middle and lower sections, the flexible and stretchable cord having a first end retained on the connecting pin and a second end retained on the receiving member, the cord in tension which causes the first end of the lower section to be rapidly inserted into the second end of the middle section and the first end of the middle section to be rapidly inserted into the second end of the upper section, the upper section rotatably retained on the platform by the connecting pin;

d. a wrapper member having a body that is rotatable and slidably retained on a section of the first leg, the wrapper including a flexible strap retained at one end on the body, the second end of the flexible strap retained on a receiving opening in the body;

e. the respective upper section, middle section and lower section of the first leg member, second leg member and third leg member are foldable so that, in the folded condition, each section of each leg member is separated from an adjacent section on the leg member and folded so that the three sections of each leg member are adjacent to each other but retained together by the flexible and stretchable cord extending through the three sections of a given leg member, the folded sections of the three legs retained together by the flexible strap on the wrapper member wrapped around all sections of all three leg members and fastened by the second end retained in the receiving opening in the body of the wrapper member, and when the flexible strap is unwound, a respective one of the middle and lower sections of each leg member rapidly close into an adjacent leg section and a respective one of the middle and upper sections of each leg member rapidly close into an adjacent leg section to rapidly form an erect tripod, with the three leg members each retained in an opened condition due to the tension on the interior in each respective leg member created by a respective flexible and stretchable cord inside each respective leg member serves to form an erect tripod, the three leg members only connected by the platform, the three leg members retained in an opened condition to support the photographic equipment without requiring any additional interconnecting support between the three leg members;

f. each of the three leg sections which are connected to the platform are rotatably connected to the platform, the platform in turn is used to support a photographic equipment mounting member which are hemispherical sections which in turn support a rotatable ball member which contains a the platform and a threaded member extending through the platform, which threaded member is threaded into a receiving member on a piece of photographic equipment so that the piece of photographic equipment is rotated and adjusted to any desired angle based on the ball member and an adjustment member on the ball member; and, g each of the three leg members when in the opened condition are sufficiently strong to support a piece of photographic equipment.

* * * * *